Patented Dec. 16, 1930

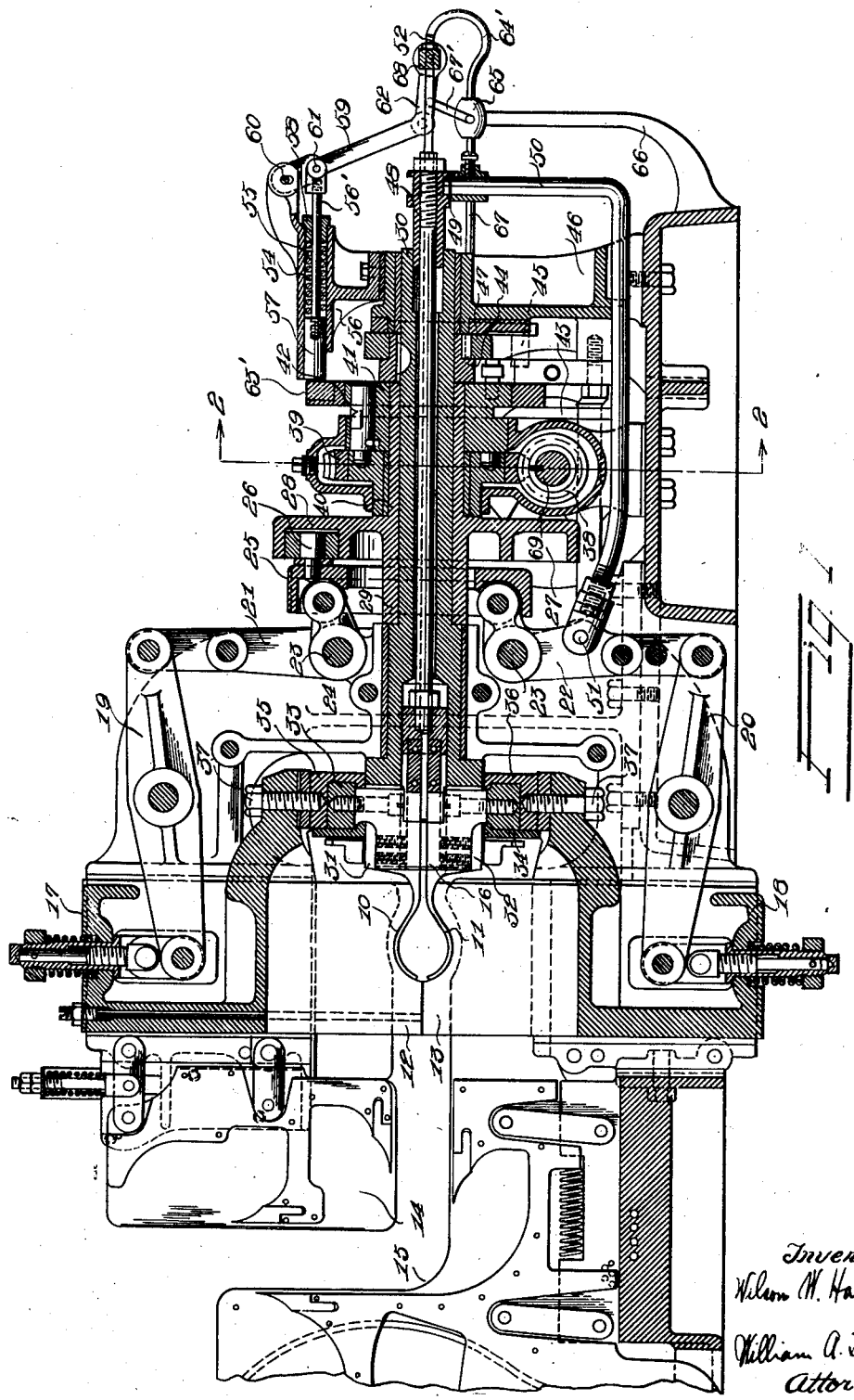

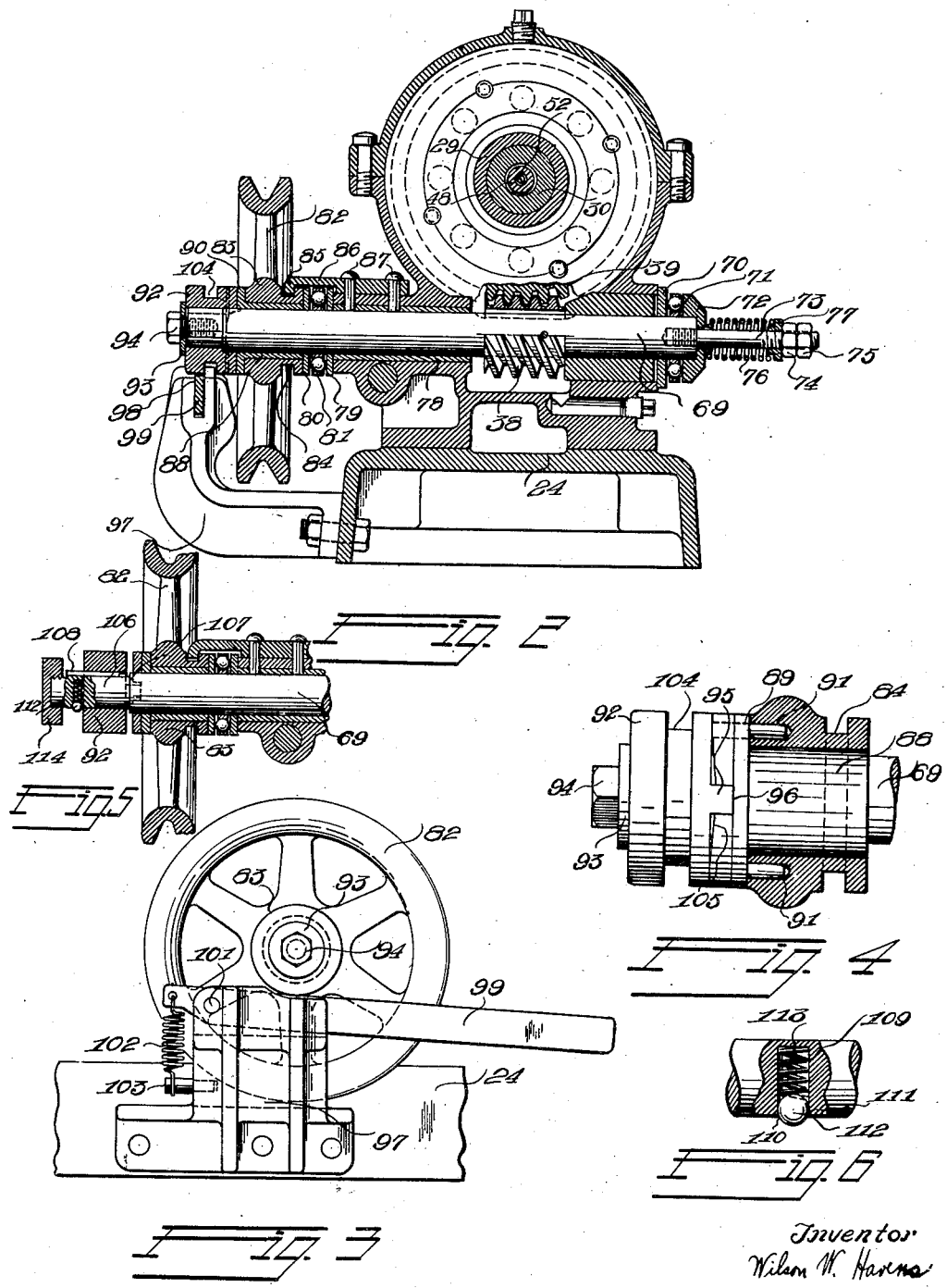

1,785,013

UNITED STATES PATENT OFFICE

WILSON W. HAVENS, OF OAKLAND, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT PITTING AND CORING MACHINE

Application filed November 25, 1927, Serial No. 235,623. Renewed August 19, 1930.

This invention relates to pitting or coring machines embodying drive mechanisms especially designed to prevent breaking of the pitting knives, and presents improvements on the machines disclosed in pending applications of Arthur L. Duncan, Serial No. 191,334 filed May 14, 1927; 209,488 filed July 30, 1927; and Serial No. 228,352, filed October 24, 1927. While the present invention relates particularly to machines of the character disclosed in said applications, it is to be understood that the invention is capable of use with machines of other types.

In the peach pitting machines of applications No. 191,334 and 209,488 difficulty has been experienced due to the breaking of the pitting knives. Such breakage was due to several causes. In the first place, though the knives were made of steel, that had a certain degree of resilience, occasionally peaches were encountered so green and consequently so hard, that the knives were sprung out of shape in forcing them through the fruit. Such bent knives were caught in the pocket formed by the jaws of the machine and broken. Again in other cases abnormal pits were encountered including hard shelves that extended beyond the radii of the knives and engaged the knives causing them to snap off in some instances.

Accordingly a primary object of my invention is the provision of a driving mechanism for operating pitting machines which causes the knives to be stopped from being forced thru the fruit, by automatically causing the machine to stop if a resistance is encountered by the knives.

A still further object of the invention is the provision of drive mechanism for pitting machines that is simple in construction, reliable of operation, unlikely to get out of order, and in which adjustment of the degree of pressure to which the knives may be subjected can be readily made so that breakage of the knives may be easily prevented.

Still further objects will appear as a description of the invention proceeds, with reference to the accompanying drawings in which:—

Figure 1 is a longitudinal sectional view of the peach pitting machine.

Figure 2 is a transverse sectional view taken substantially on the plane of line 2—2 in Figure 1.

Figure 3 is a left side elevational view of the mechanism illustrated in Figure 2.

Figure 4 is a part plan and part longitudinal sectional view of the clutch member.

Figure 5 is a fragmental longitudinal sectional view depicting a modification, and Figure 6 is a fragmental longitudinal section disclosing the yieldable clutch element retaining means.

In the drawings like reference characters designate like parts throughout the several views.

The invention is shown as applied to the peach pitting machine disclosed in co-pending application Serial No. 191,334, filed May 14, 1927. As described in detail in said application, the machine comprises a pair of curved pitting knives 10 and 11, a pair of holding jaws 12 and 13, and spaced blades 14 and 15 providing a path between them for the pit of the peach. Blades 14 and 15 form a circumferential recess in the flesh of the fruit surrounding the sharp edge of the pit, and guide the fruit into position between the jaws 12 and 13 and the knives 10 and 11 which are normally open to receive the pit. A retractable gauge 16 determines the extent of movement of the pit and stops it in proper position between the pitting knives. If desired, the fruit can be moved manually to the end of the vertical branch of the angular path between blades 14 and 15, and mechanically operated cups may then engage the fruit and move it through the horizontal branch of said path after the manner disclosed in Arthur L. Duncan's patent, Reissue #16,259, granted February 9, 1926.

The jaws 12 and 13 and the knives 10 and 11 are carried in slides 17 and 18 that are reciprocated toward and from each other by levers 19 and 20 that are pivotally connected to the slides at one arm of bell crank levers 21 and 22 pivoted at 23 to the frame 24 of the machine. The other arms of levers 21 and 22 are linked together by a member 25 for unitary movement. Member 25 has a cam roller 26 secured thereto which rides in a cam groove 27 of a cam 28 carried by a sleeve 29 which rotatably surrounds the main shaft 30 of the machine. The cam groove 27 is formed so that the jaws and knives are opened and closed to embrace and center the pit at proper intervals.

Knives 10 and 11 are, however, rotatable bodily with respect to the jaws 12 and 13. To effect their rotation at the proper time, the knife holders 31 holding said knives are placed in furcations 32 of main shaft 30 said knife holders being slidable in said furcations to permit their movement with jaws 12 and 13. The knife holders 31 of said knives are connected to the slides 17 and 18 by projections 33 and 34, and slide in curved guides 35 and 36 bolted to said slide projections by bolts 37. Said guides may be circular or oval, as may be desired, to determine the course of bodily movement of the pitting knives thru the flesh of the fruit.

The parts above described receive their motion from a worm 38 which is power driven in a manner presently to be described. This constitutes the subject matter of the invention of this application.

Worm 38 meshes with worm wheel 39 rotatably mounted on an extension 40 from sleeve 29. A sleeve 41 surrounds extension 40 and is keyed thereto. A sliding pin 42 clutches worm wheel 39 and sleeve 41 together for rotation through one revolution, the pin 42 being released from sleeve 41 by a tripping member 43 which retracts the pin after each revolution. Sleeve 41 carries a pawl (not shown) which engages a tooth on a sleeve 44 after sleeve 41 and sleeve 29 secured thereto have been rotated through a portion of a revolution to close the knives 10 and 11 and the jaws 12 and 13 about the pit. Sleeve 44 is keyed to the main shaft 30 for rotation therewith. A locking dog 45 carried by an upward extension 46 of frame 24 engages, at intervals, a tooth on a collar 47 keyed to sleeve 44 to hold the knives 10 and 11 in proper position at the completion of each operation.

Gauge 16 is retracted as the jaws 12 and 13 and the knives 10 and 11 are moved toward each other to close about the peach pit, by means of a tube 48 which is arranged in a longitudinal bore in the main shaft 30. Gauge 16 is secured at one end to tube 48. At the other end of said tube an actuating bracket 49 engages the yoke end of a bent lever 50 which is pivotally attached at 51 to bell crank 22, so that the movements of the jaw 13, is itself controlled by bell crank 22.

So far as described the machine is identical to that fully described in application Serial No. 191,334 above referred to and reference may be had to said application for a detailed description of the parts that are above described generally. The machine of this application also includes the mechanical ejector described in application Serial No. 209,488. Said ejector comprises a tubular member 52 closed at one end. Tubular member 52 extends thru the tube 48 and gauge 16 and is projected to the left viewing Figure 1, when the knives and jaws are open to engage the edge of the pit with a sharp blow to cause the pit to be ejected from the machine and to wedge apart the halves of the fruit if they adhere to the faces of the jaws as more fully described in the application just referred to.

Rod 52 is caused to move to its operative position by a spring 54 arranged in a bore 55 of bracket 56 bolted to the machine in any suitable manner. Spring 54 surrounds a rod 56' and is arranged between the head 57 secured to said rod and a sleeve 58 threaded in the bore of bracket 56. The movements of the rod 56' under the influence of spring 54 are communicated to the ejector rod 52 by a lever 59 connected by a lost motion connection 60 to an extension of bracket 56. The rod 56' is pivotally connected to lever 59 at 61 so that the movements of the rod are communicated to said lever. The opposite end of lever 59 is connected by a link 62 to the free end of rod 52 before referred to, a nut 63 serving to adjust the effective length of said rod. A cam 63' controls the spring 54 releasing it at the proper moment to eject the pit and fruit halves. The operation of the ejector just referred to is more fully pointed out in application Serial No. 209,488. The machine of this application also includes the jaw and pitting knife rinsing and flushing means disclosed and claimed in application No. 228,352 filed October 24th, 1927 adapted to spray the jaws and knives with a stream of water after each operation. Said stream is brought into play thru tubular member 52 constituting the mechanical ejector above referred to which is provided with a plurality of inclined openings adjacent the operative end thereof. Water under pressure is supplied to said member by a flexible tube 64' arranged between the free end of tubular member 52 and a valve 65 carried by a bracket 66 secured to the base of the machine. A pipe 67 connected to any suitable source of water supply is connected to valve 65. In order that the flow of water may be turned on periodically, the opening of the valve 65 is controlled by the movements of the ejector member 52. To accomplish this, valve 65 is provided with an actuating lever 67' which is biased by means of a spring (not shown) toward the position at which the valve is closed.

As clearly shown in Figure 1, the end of lever 67' is arranged in the path of movement of an abutment 68 carried by the ejector rod 52, the arrangement being such that when the ejector rod moves forward to bring the openings into position between the jaws and the knives, the abutment 68 will engage the lever 67' to cause the valve to be opened and to thus project streams of water against the jaws and knives of the machine washing them clean.

The above is a general description of a peach pitting machine which is described more in detail and claimed in the above noted applications and forms no part of the present invention. The present invention relates to a drive mechanism, therefor which will now be described.

The worm 38 is keyed to shaft 69 against both longitudinal and rotational movement relative to the shaft. Shaft 69 extends transversely of the pitting machine and is supported within the frame 24 thereof. The shaft 69 adjacent one end thereof extends thru a bearing plate 70 and thru a ball bearing assembly 71 which bears against plate 70 and on its extreme end the shaft is provided with a cap member 72 bearing against the ball bearing assembly. Threaded into the same end of shaft 69 is one end of a rod 73 which has its opposite end threaded adapted to receive adjusting and lock nuts 74 and 75 respectively. A compression coil spring 76 surrounds rod 73 having its opposite ends in engagement with cap 72 and a collar 77 located on rod 73 which bears against adjusting nut 74. Shaft 69 intermediate its ends is journaled in a bushing 78 against the outer end of which a bearing plate 79 is disposed. A similar bearing plate 80 surrounds shaft 69 in spaced relation to bearing plate 79 and a ball bearing assembly 81 is interposed between plates 79 and 80. Supported by shaft 69 is a drive pulley 82 the hub portion 83 of which engages the bearing plate 81 and is provided with a circumferential groove 84 adapted to receive an inturned end 85 of a clip 86 which is secured to the frame of the machine by the screws 87.

Pressed within the hub member 83 of pulley 82 and journaled on shaft 69 is the cylindrical sleeve portion 88 of a jaw clutch member 89. Member 89 is provided with a notched face member 90 secured to the hub 83 by means of dowels 91 (Figure 4). Securely keyed to the end of shaft 69 and adapted to normally engage clutch member 83 is a cooperating clutch member 92 which is held against outward movement by means of a washer 93 which is held in position by means of a securing cap screw 94 threaded into the adjacent end of shaft 69. Clutch member 92 is provided with a projecting tooth 95 adapted to nest or seat in a recess or notch 96 in clutch member 89 to connect the clutch members for simultaneous rotation.

Secured to the base of the frame of the machine is a bracket 97 which has the outer end thereof in proximity to clutch member 92 as clearly shown in Figure 2. The outer end of bracket 97 is provided with a slotted recess 98 adapted to loosely receive and guide clutch control lever 99 which is pivoted to the bracket by means of pin 101. A coil spring 102 is connected to the end of lever 99 adjacent pivot pin 101 and has the opposite end thereof secured to a stud 103 projecting outwardly from bracket 97. Spring 102 resiliently holds the intermediate portion of lever 99 against the clutch member 92. Clutch member 92 is provided with a circumferential groove 104 adapted to receive lever 99 upon endwise movement of shaft 69 and the clutch member.

It will be noted from Figure 4 that clutch member 89 is provided with an inclined surface 105 against which projection 95 will ride insuring the alining of groove 104 with lever 99 upon disengagement of the clutch members as will more fully hereinafter appear.

In the normal operation of the machine, power is transmitted from drive pulley 82 and clutch member 89 rigidly secured thereto thru clutch member 92 which is fixed to shaft 69 and is operatively engaged with clutch member 89 thru projection 95 and recess 96, and thence thru shaft 69 to worm 38 which is fixed to the shaft and which meshes with and imparts rotation to worm wheel 39 driving the pitting knives.

If during operation, obstruction be encountered, the resistance to rotation of worm wheel 39 will be greater than the reactive force of the spring 76 and consequently the worm 38 instead of imparting rotation to the worm wheel 39, will thread itself along the teeth thereof and force the shaft 69 to the left against the reactive force of spring 76. When this occurs, clutch member 92 being fixed to the shaft will be forced away from clutch member 89 which is retained in position by projection 85 entering recess 84 and tooth 95 will be forced out of recess 96 and will ride up on inclined surface 105 as rotation of the drive pulley 82 continues until groove 104 comes into vertical alinement with lever 99 whereupon thru the action of spring 102, lever 99 will enter groove 104 and hold clutch member 92 out of engagement with clutch member 89. In this position of parts, pulley 82 will revolve on shaft 69 as cylindrical portion 88 of the clutch member is journaled on shaft 69 and as a result the driving connection to shaft 69 will be broken obviating the danger of breaking the pitting knives.

Lever 99, as can be seen in Figure 3 extends forwardly of the machine within reach of the operator who, after clearing the obstruction from the machine, may again set the machine into operation by depressing the free end of lever 99 and forcing it out of groove 104. As soon as lever 99 clears groove 104, spring 76 will throw the clutch members 89 and 92 into operative engagement and tooth 95 will drop into notch 96, a driving connection will again be established between pulley 82 and shaft 69.

In Figures 5 and 6 is disclosed a modification in the clutch disengaging means.

In this modified form of the invention the shaft 69 is provided with a reduced extension 106 providing a shoulder 107.

The clutch member 92 is keyed to the extension 106 by means of a key 108 adapting the clutch members 92 for longitudinal movement on the extension 106. The extension 106 adjacent the outer face of clutch member 92 in normal position is provided with a bore 109 which as shown in Figure 6, is provided with a reduced open end 110 forming a spherical seat 111 for a spherical member 112, the spherical member being normally maintained in engagement with the seat 111 by means of a coil spring 113 resting between the spherical member and the bottom of the bore 109 and normally urging the spherical member outward exposing less than half the surface area thereof. A suitable cap 114 threadedly engages the end of extension 106.

The clutch members 92 and 83 are provided with the cooperating tooth 95 and notch 96 as in the first described form and the clutch member 83 is provided with the inclined surface 105.

In this form of the invention the shoulder 107 upon the shaft 69 being forced to the left engages the clutch member 92 and forces it to the left whereupon the tooth 95 disengages the notch 96. Upon continued rotation of clutch member 83 by means of the pulley 82 the inclined surface 105 engages the end of the tooth 95 and forces the clutch member 92 to the left relative to the extension 106 whereupon the spherical member 112 engages the inner surface of clutch member 92 with sufficient friction that the clutch member 92 will be retained in disengagement with the clutch member 83 until the obstruction is removed from the pitting knives, whereupon the clutch member 92 is pressed back into engagement with clutch member 83 and the machine accordingly set into operation.

It will be noted upon inspection of Figure 6 that the spherical member 112 engages seat 111 precluding any possibility of the spherical member inadvertently falling out of the bore.

It will thus be seen that a novel drive especially adapted for peach pitting machines is provided which causes the pitting knives to be forced thru the fruit and positively obviates any danger of the knives being bent or broken when an obstruction is encountered thereby.

The invention may be embodied in other forms without departing from the spirit or essential characteristics thereof. The present embodiment is therefore to be regarded in all respects as illustrated and not restrictive. The scope of the invention being indicated by the appended claims rather than by the foregoing description, and all changes which come within the meaning and range of equivalency of the claims are intended to be embraced therein.

I claim:

1. A fruit pitting machine of the type that includes a rotatable pitting knife arranged to turn about the pit, comprising a drive shaft adapted to impart rotation to said knife, a worm wheel carried by said shaft, a second shaft, a worm secured to said second shaft and adapted to mesh with said worm wheel, a driving pulley loosely mounted on said second shaft, co-operating clutch members carried by said second shaft and said driving pulley respectively, and yieldable means carried by said second shaft to urge it yieldingly toward said pulley whereby upon said pitting knife encountering an obstruction said second shaft is permitted to move relative to said pulley to disengage said clutch members, said yieldable means being arranged adjacent an end of said second shaft and including accessible means to adjust the yielding effect thereof.

2. A fruit pitting machine of the type that includes rotatable pitting means, comprising a shaft adapted to impart rotation to said pitting means, a worm wheel carried by said shaft, a second shaft supported for endwise movement and disposed at right angles to said first shaft, a worm fixed on said second shaft and adapted to mesh with said worm wheel to impart rotation thereto, a yieldable member supported by said second shaft to retain it from endwise movement under normal conditions, a driving pulley loosely supported on said second shaft, co-operating clutch members carried by said second shaft and said pulley and maintained in operative engagement by said yieldable member, said yieldable member being disposed adjacent an end of said second shaft and provided with readily accessible adjusting means and being arranged so that when said pitting means encounter an obstruction said second shaft is permitted to yieldably move relative to said driving pulley to disengage said clutch members.

3. In a fruit pitting machine of the type that includes knives arranged to rotate about the pit, a main shaft, provided with a worm wheel, an auxiliary shaft disposed at right angles to said main shaft and provided with a worm adapted to mesh with and impart rotation to said worm wheel, a drive pulley loosely journaled on said auxiliary shaft adjacent one end thereof, a clutch member carried by said drive pulley, a clutch member carried by said auxiliary shaft, a compression coil spring carried by the opposite end of said auxiliary shaft adapted normally to hold said clutch members in operative engagement, said coil spring upon resistance to rotation being increased in said worm wheel adapted to be compressed permitting said auxiliary shaft to move in a longitudinal direction relative to said drive pulley to disengage said clutch members and means to adjust the tension of said coil spring.

4. In a fruit pitting machine of the type that includes knives arranged to rotate about the pit, a main shaft provided with a worm wheel, an auxiliary shaft provided with a worm adapted to mesh with and impart rotation to said worm wheel, said auxiliary shaft journaled in the frame of the machine a thrust bearing plate engaging said frame adjacent one end of said auxiliary shaft, a thrust bearing assembly engaging said plate, an apertured cap member engaging said thrust bearing assembly and receiving said end of said auxiliary shaft, a rod secured to said end of said auxiliary shaft and extending therefrom thru the aperture in said cap member, a coil spring disposed about said rod having its opposite ends in engagement with said cap member and a collar disposed on said rod respectively, adjusting and lock nuts engaging a threaded end of said rod and engaging said collar, a drive pulley loosely journaled on the opposite end of said auxiliary shaft, clutch members carried by said auxiliary shaft, and drive pulley respectively, said coil spring adapted normally to hold said clutch members in operative engagement and adapted to yield upon resistance to rotation being offered by said worm wheel to permit said auxiliary shaft to shift longitudinally thereof to yieldably retard the rotation of said main shaft and upon undue resistance to rotation being offered by said worm wheel adapted to disengage said clutch members.

5. A fruit pitting machine of the type that includes rotatable pitting means, comprising a main shaft adapted to impart rotation to said pitting means, a worm wheel carried by said main shaft, an auxiliary shaft provided with a worm adapted to mesh with and impart rotation to said worm wheel, a drive pulley loosely journaled on said auxiliary shaft, clutch members carried by said auxiliary shaft and drive pulley respectively, yieldable means carried by said auxiliary shaft adapted to provide a yieldable drive connection between said worm wheel and said worm whereby said pitting means are cushioned upon meeting a small obstruction and further adapted upon said pitting means meeting an unusually large obstruction to permit said auxiliary shaft to shift longitudinally to disengage said clutch members and to thereby totally arrest the movement of said pitting means, and a lever urged toward said auxiliary shaft in a position to engage means on said shaft and hold the clutch members in disengaged position until said lever is manually actuated.

6. A peach pitting machine comprising rotatable pitting means, a shaft adapted to impart rotation to said pitting means, a worm wheel secured to said shaft, a second shaft disposed at right angles to said first shaft, thrust ball bearing assemblies associated with said second shaft adjacent the ends thereof, a worm secured to said second shaft adapted to mesh with and impart rotation to said worm wheel, a drive pulley loosely journaled on said second shaft, adjacent one end thereof, co-operating jaw clutch members carried by said second shaft and said pulley respectively, a coil spring carried by the opposite end of said second shaft adapted normally to hold said clutch members in operative engagement and said worm yieldable in mesh with said worm wheel, said spring adapted to yield upon resistance to rotation of said worm wheel, whereupon said second shaft will be moved longitudinally by means of said worm threading itself along the teeth of said worm wheel and disengage said clutch members, and automatic means to hold said clutch members in disengaged position.

7. The combination set forth in claim 6 in which said last means comprises a lever pivoted adjacent one end thereof to a bracket supported by the frame of the machine, a coil spring engaging the end of said lever adjacent said pivot to normally hold said lever in engagement with said clutch member carried by said second shaft, said lever adapted thru the action of said spring to engage a circumferential groove in said clutch member upon a predetermined longitudinal movement of said second shaft to hold said clutch member disengaged, said lever extending within reach of the operator whereby it can be manually operated to be drawn out of said groove whereupon said spring will immediately re-engage said clutch members.

In testimony whereof I affix my signature.

WILSON W. HAVENS.